No. 809,489. PATENTED JAN. 9, 1906.
C. J. CALEY.
SASH PULLEY.
APPLICATION FILED JULY 3, 1905.

Witnesses

Inventor
CHARLES J. CALEY
By his Attorneys

UNITED STATES PATENT OFFICE.

CHARLES J. CALEY, OF NEW BRITAIN, CONNECTICUT, ASSIGNOR TO RUSSELL & ERWIN MANUFACTURING COMPANY, OF NEW BRITAIN, CONNECTICUT, A CORPORATION OF CONNECTICUT.

SASH-PULLEY.

No. 809,489.　　　Specification of Letters Patent.　　　Patented Jan. 9, 1906.

Application filed July 3, 1905. Serial No. 268,073.

*To all whom it may concern:*

Be it known that I, CHARLES J. CALEY, a citizen of the United States, residing at New Britain, county of Hartford, State of Connecticut, have invented certain new and useful Improvements in Sash-Pulleys, of which the following is a full, clear, and exact description.

My invention relates to improvements in hardware, and particularly to sash-pulleys.

The object of the invention is to provide a simple construction of a pulley which may be manufactured economically, assembled and adjusted readily, and operate with freedom from friction.

The invention consists in improvements the principles of which are illustrated in the accompanying sheet of drawings.

Briefly, it comprises a frame, a pair of cone-bushings carried by the frame, a pulley or sheave having ball-bearings coöperating with the cone-bushings, and a screw for drawing the two bushings together and holding the parts in their proper assembled relation.

Figure 1:
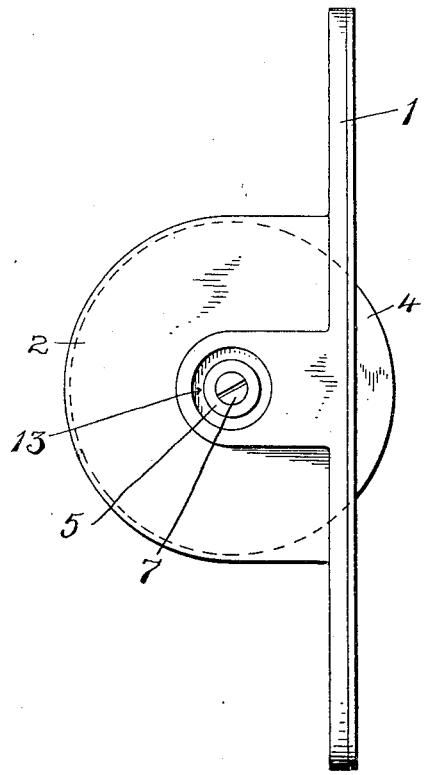
Figure 2:
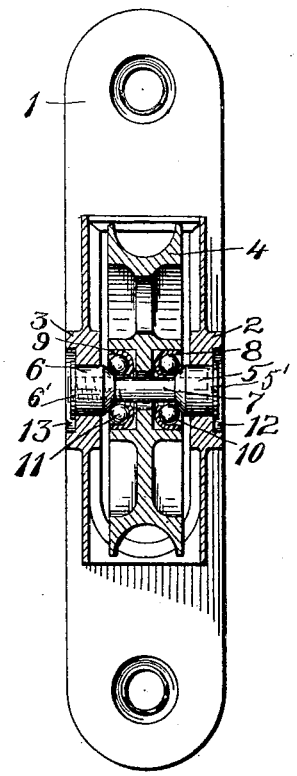

Figure 1 is a side view of a pulley embodying the improvements of my invention. Fig. 2 is a vertical section and rear view of the same.

1 is the face-plate of the frame.

2 and 3 are the side arms or plates.

4 is a pulley or sheave over which the sash cord or chain is adapted to run.

5 and 6 are the bushings, formed, preferably, of hardened steel and adapted to be inserted in openings in the side arms 2 and 3, respectively.

7 is a screw which passes through a drilled hole in the bushing 5 and whose head takes against an annular seat in the outer end thereof. The other end of the screw is threaded and takes into a tapped hole in the bushing 6.

8 and 9 are ball-races, which are preferably formed separate from the body of the pulley 4 and inserted in annular recesses around its axis.

10 and 11 indicate series of balls seated in the ball-races 8 and 9.

When the parts are assembled, as shown in Fig. 2, the screw 7 may be tightened or loosened to give the necessary adjustment to the bearings, the bushing 6 being held with the hand or in any other suitable manner. The left-hand end of the screw is then secured from accidental retraction by a suitable means, preferably by upsetting the end. The side arms 2 and 3 are slightly yielding, so that when the screw 7 is set up the shoulders 5' and 6' of the bushings 5 and 6 may take up against the side arms before the minimum adjustment is reached. The parts are then held from accidental working loose of the bearings and the pulley is always maintained in its proper position free from lateral play or looseness. The shoulders of the bushings 5 and 6 and the ends of the screw are preferably located in countersunk portions 12 and 13 in the side arms, so that they do not protrude and will not interfere with the setting up of the pulley.

The advantages of this construction, aside from those above pointed out, will be apparent to those skilled in the art.

What I claim is—

1. A sash-pulley comprising a frame having a face-plate and two side arms connected thereto, with passages through said side arms and countersunk enlargements around the outer sides thereof, a sheave or pulley, a series of antifriction-balls arranged in each end of the hub thereof, a removable cone-bushing carried in the passage in each side arm, a shoulder on each bushing located in the countersunk portion of the side arm, one of said bushings having a drilled hole and the other bushing having a tapped hole, and a screw passing freely through the drilled hole of the one bushing and taking into the tapped hole in the other bushing.

2. In a sash-pulley, the combination of a frame having yielding side arms, a sheave having a series of ball-bearings at each end of its hub, removable cone-bushings seated in openings in said side arms and having shoulders abutting against the outer faces thereof, and a screw for adjusting said bushings with regard to said bearings.

CHAS. J. CALEY.

Witnesses:
　M. S. WIARD,
　C. E. RUSSELL.